United States Patent
Farrugia et al.

(10) Patent No.: US 9,017,910 B2
(45) Date of Patent: Apr. 28, 2015

(54) POLYHEDRAL OLIGOMERIC SILSESQUIOXANE TONER RESINS

(71) Applicant: Xerox Corporation, Norwalk, CT (US)

(72) Inventors: Valerie Farrugia, Oakville (CA); Kimberly Nosella, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 253 days.

(21) Appl. No.: 13/651,452

(22) Filed: Oct. 14, 2012

(65) Prior Publication Data

US 2014/0106274 A1 Apr. 17, 2014

(51) Int. Cl.
- *G03G 9/08* (2006.01)
- *C08G 63/695* (2006.01)
- *B82Y 30/00* (2011.01)
- *G03G 9/16* (2006.01)

(52) U.S. Cl.
CPC .............. *C08G 63/6954* (2013.01); *B82Y 30/00* (2013.01); *G03G 9/16* (2013.01)

(58) Field of Classification Search
CPC .................................. G03G 9/08; G03G 5/14752
USPC .................................. 430/109.3, 109.4, 108.3
See application file for complete search history.

(56) References Cited

U.S. PATENT DOCUMENTS

| 7,985,523 | B2 * | 7/2011 | Zhou et al. | 430/109.3 |
| 8,084,177 | B2 * | 12/2011 | Zhou et al. | 430/108.3 |
| 2007/0082285 | A1 * | 4/2007 | Matsuoka et al. | 430/109.3 |
| 2008/0197283 | A1 * | 8/2008 | Veregin et al. | 250/315.3 |
| 2010/0159376 | A1 * | 6/2010 | Zhou et al. | 430/108.3 |
| 2010/0248123 | A1 * | 9/2010 | Iwanaga et al. | 430/109.4 |

* cited by examiner

*Primary Examiner* — Peter Vajda
*Assistant Examiner* — Olatunji Godo
(74) *Attorney, Agent, or Firm* — MDIP LLC

(57) ABSTRACT

The present disclosure provides a toner resin comprising a polyhedral oligomeric silsesquioxane moiety that may be used in manufacturing an emulsion aggregation (EA) toner for imaging devices.

20 Claims, No Drawings

POLYHEDRAL OLIGOMERIC SILSESQUIOXANE TONER RESINS

FIELD

Polyester resin comprising a polyhedral oligomeric silsesquioxane moiety which may be used to make toner particles; developers comprising said toner particles; devices comprising said toner particles and developers; imaging device components comprising said toner particles and developers; imaging devices comprising said developers; and so on, are described.

BACKGROUND

Emulsion aggregation (EA) toner particles may comprise polyester resins, which resins are used to make polymer particles, where the particles are aggregated to form structures of a desired shape and size, followed by the coalescence of the aggregated particles, for example, at an elevated temperature. The components incorporated into the toner shape the characteristics of the final toner particles. For example, a colorant may be added, a wax may be added to provide release from a fuser roll, and a binder resin may be added to provide a low minimum fusing temperature (MFT). Another toner property which may be controlled by the components of the EA toner particles is fused image gloss. Examples of teachings of materials and methods for making EA toner include U.S. Pat. Nos. 5,290,654; 5,344,738; 5,346,797; 5,496,676; 5,501,935; 5,747,215; 5,840,462; 5,869,215; 6,828,073; 6,890,696; 6,936,396; 7,037,633; 7,049,042; 7,160,661; 7,179,575; 7,186,494; 7,217,484; 7,767,376; 7,829,253; 7,858,285; and 7,862,971, the disclosure of each of which hereby is incorporated by reference in entirety.

With an increased focus on environmental impacts on health, there is an interest and/or a need to find suitable reagent replacements to reduce health risks associated with toner production and use. Many current polyester-based toners are derived from bisphenol A monomer. Bisphenol A (BPA) has been linked to a variety of health concerns, and according to some studies, has been found to be present in the urine of 93-95% of adults and children. High BPA levels are associated with heart disease, diabetes and abnormally high levels of certain liver enzymes in humans. BPA is an endocrine system disruptor and can mimic hormones, including estrogen, potentially causing adverse health affects. Exposure to estrogenic compounds during critical periods of fetal development may result in adverse effects on the development of reproductive organs that may not be apparent until later in life. Countries, such as, Canada, and several U.S. states are considering banning the chemical.

It is desirable, then, to employ toner that has a lower negative impact on the environment and health.

SUMMARY

The instant disclosure provides a polyester resin comprising a polyhedral oligomeric silsesquioxane (POSS) moiety which may be used in manufacturing toner for imaging devices. In embodiments, the POSS may enhance thermal and chemical stability of the growing and formed polymers.

In embodiments, a toner resin is disclosed comprising a reaction product of at least a POSS moiety having the general formula as set forth in formula (I):

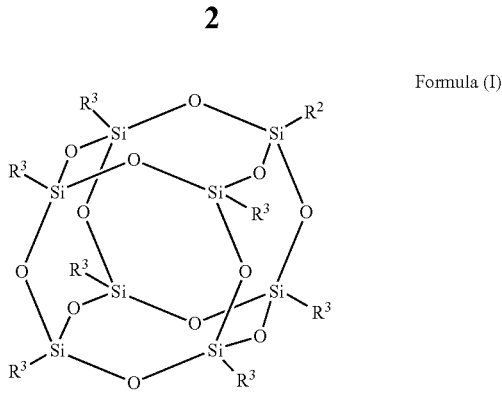

Formula (I)

where $R^2$ and $R^3$, may be the same or different, and each of $R^2$ and $R^3$ may be either a saturated or unsaturated aliphatic hydrocarbon, which may be linear or branched, an aromatic hydrocarbon, an epoxide group, a halide, an alcohol group, an acid group, an ester group, an amine, a nitrile, a cyanate, an amide and combinations thereof.

In embodiments, a toner resin is disclosed which comprises a trans-cyclohexanediol isobutyl poly-octahedral oligomeric silsesquioxane.

In embodiments, a toner comprising a resin comprising a POSS moiety and an aromatic acid, such as, trimellitic acid, is disclosed.

In embodiments, a method of making a toner resin is disclosed including mixing a dicarboxylic acid, such as, benzenedicarboxylic acid and/or dodecylsuccinic anhydride, a diol, such as, isosorbide, an optional first catalyst and a POSS to form a first mixture in a reaction vessel, where the POSS has the general formula as set forth in formula (I) as described above; heating the first mixture to about 250° C. under atmospheric pressure; removing water by-product; and discharging the resulting polymer resin from the vessel.

DETAILED DESCRIPTION

I. Introduction

The present disclosure provides a polyester resin comprising a POSS moiety that may be used to produce toner particles, toners, developers comprising said toner particles, devices comprising said toner particles or said developers, imaging devices comprising said developers, imaging device components comprising said developers, systems which include such toner particles or developers, and so on.

Reactive polyhedral oligomeric silsesquioxanes (POSS) are used as a replacement of, for example, BPA in polyester resins for emulsion aggregation (EA) toner. While not being bound by theory, incorporation of a POSS moiety, such as trans-cyclohexanediol isobutyl polyoctahedral oligomeric silsesquioxane, into the side or main chains of polyesters enhance thermal and chemical stability due to the rigidity of the inner silicon and oxygen framework. Thus, trans-cyclohexanediol isobutyl poly-octahedral oligomeric silsesquioxane, and other POSS monomers, are suitable replacements for BPA monomers in plastics. The POSS moieties are non-toxic and biocompatible.

POSS is a spherosilicate polyhedral molecule with the general composition $R'_1R_7Si_8O_{12}$. An advantage POSS offers is chemical versatility enabling POSS to be incorporated into many polymer matrices, such as, polynorbornene, poly(4-methyl styrene), polymethacrylate, polycarbonate, epoxides, thene-propene copolymers, siloxane polymers and dendrimers. An example of a generic POSS molecule (T8 cage, meaning 8 vertices per face) along with possible R groups is as described above.

Commercially available reactive POSS moieties which may be used as a replacement to BPA are shown in structural formulas (II)-(VII)

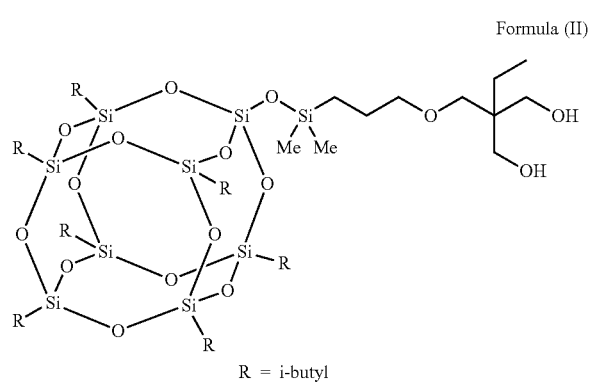

R = i-butyl
TMP Diisobutyl POSS®

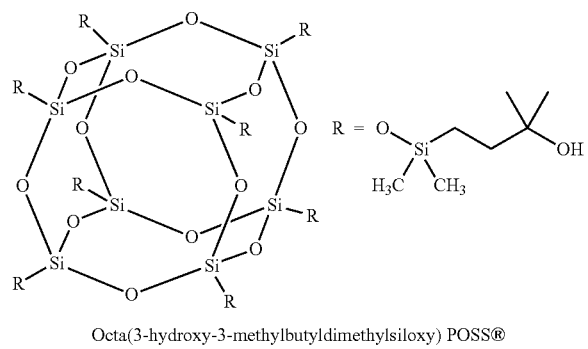

Octa(3-hydroxy-3-methylbutyldimethylsiloxy) POSS®

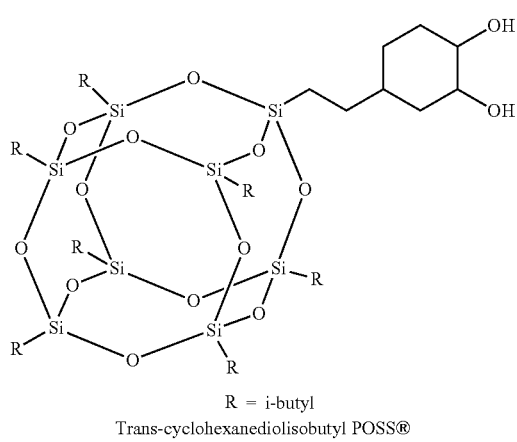

R = i-butyl
Trans-cyclohexanediolisobutyl POSS®

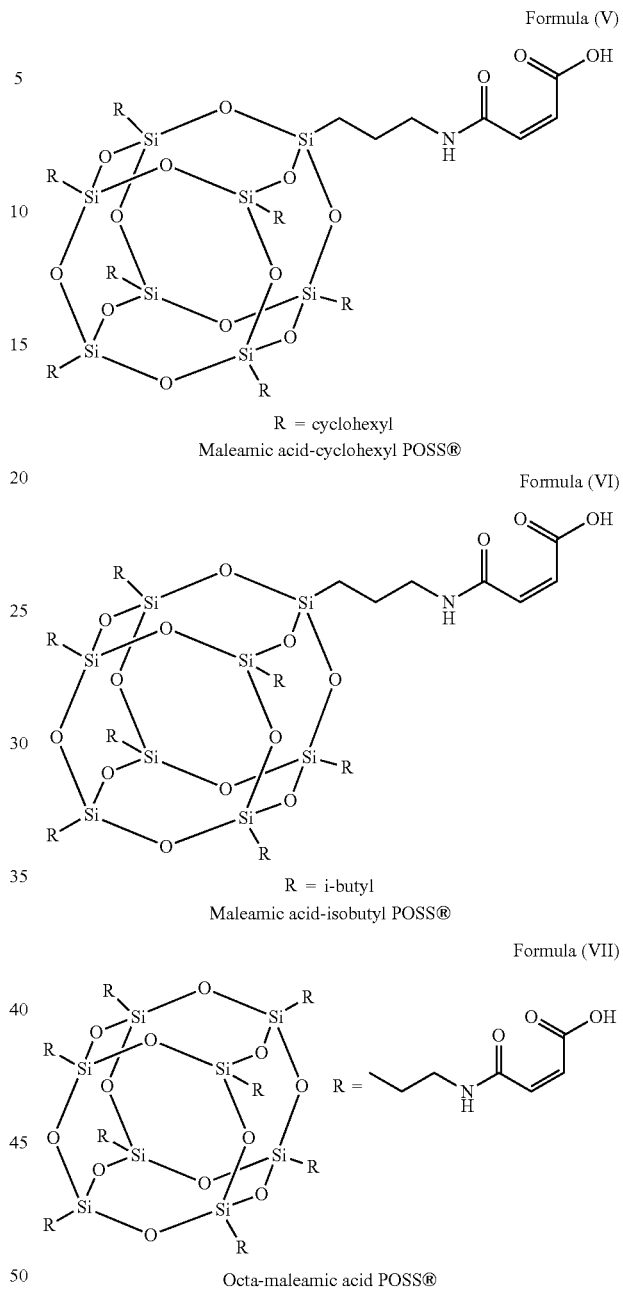

R = cyclohexyl
Maleamic acid-cyclohexyl POSS®

R = i-butyl
Maleamic acid-isobutyl POSS®

Octa-maleamic acid POSS®

One or more corner groups in a POSS molecule may be substituted by a functional group through conventional organic conversion. Typical functional groups attached to POSS include, but are not limited to, methacrylate, acrylate, styrene, norbornene, amine, epoxy, alcohol and phenol which provide the possibility to incorporate POSS into a polymer chain or network through polymerization or grafting.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating," and "matching," or grammatical variations thereof, have generally acceptable definitions or at the least, are understood to have the same meaning as, "about."

II. Toner Particles

Toner particles of interest comprise a polyester resin that is made using a POSS.

The resin comprises a POSS moiety-containing polyester polymer, and in the context of a toner for use with certain imaging devices, comprises a polyester polymer that solidifies to form a particle. A composition may comprise more than one form or sort of polymer, such as, two or more different polymers, such as, two or more different polyester polymers composed of different monomers. The polymer may be an alternating copolymer, a block copolymer, a graft copolymer, a branched copolymer, a crosslinked copolymer and so on.

The toner particle may include other optional reagents, such as, a surfactant, a wax, a shell and so on. The toner composition optionally may comprise inert particles, which may serve as toner particle carriers, which may comprise the resin taught herein. The inert particles may be modified, for example, to serve a particular function. Hence, the surface thereof may be derivatized or the particles may be manufactured for a desired purpose, for example, to carry a charge or to possess a magnetic field.

A. Components
1. Resin

Toner particles of the instant disclosure include a resin-forming monomer suitable for use in forming a particulate optionally containing or carrying a colorant of a toner for use in certain imaging devices. Any polyfunctional monomer may be used depending on the particular polyester polymer desired in a toner particle.

In embodiments, bifunctional reagents, trifunctional reagents and so on may be used. One or more reagents that comprise at least three functional groups are incorporated into a polymer or into a branch to enable branching, further branching and/or crosslinking. Examples of such polyfunctional monomers include 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane and 1,2,7,8-octanetetracarboxylic acid, acid anhydrides thereof, lower alkyl esters thereof and so on. The branching agent may be used in an amount from about 0.01 to about 10 mole %, from about 0.05 to about 8 mole %, from about 0.1 to about 5 mole %. Polyester resins, for example, may be used for applications requiring low melting temperature.

One, two or more polymers may be used in forming a toner or toner particle. In embodiments where two or more polymers are used, the polymers may be in any suitable ratio (e.g., weight ratio) such as, for instance, with two different polymers, from about 1% (first polymer)/99% (second polymer) to about 99% (first polymer)/1% (second polymer), from about 10% (first polymer)/90% (second polymer) to about 90% (first polymer)/10% (second polymer) and so on, as a design choice.

The polymer may be present in an amount of from about 65 to about 95% by weight, from about 75 to about 85% by weight of toner particles on a solids basis.

a. Polyester Resins

Suitable polyester resins include, for example, those which are sulfonated, non-sulfonated, crystalline, amorphous, combinations thereof and the like. The polyester resins may be linear, branched, crosslinked, combinations thereof and the like. Polyester resins may include those described, for example, in U.S. Pat. Nos. 6,593,049; 6,830,860; 7,754,406; 7,781,138; 7,749,672; and 6,756,176, the disclosure of each of which hereby is incorporated by reference in entirety.

When a mixture is used, such as, amorphous and crystalline polyester resins, the ratio of crystalline polyester resin to amorphous polyester resin may be in the range from about 1:99 to about 30:70; from about 5:95 to about 25:75; from about 10:90 to about 15:85.

A polyester resin may be obtained synthetically, for example, in an esterification reaction involving a reagent comprising a dicarboxylic acid group and another reagent comprising a dialcohol. In embodiments, the alcohol reagent comprises three or more hydroxyl groups, four or more hydroxyl groups, or more. In embodiments, the acid comprises three or more carboxylic acid groups, four or more carboxylic acid groups, or more. Reagents comprising three or more functional groups enable, promote or enable and promote polymer branching and crosslinking. In embodiments, a polymer backbone or a polymer branch comprises at least one monomer unit comprising at least one pendant group or side group, that is, the monomer reactant from which the unit was obtained comprises at least three functional groups.

As provided herein, a portion or all of the polyol monomer, the polyacid/polyester monomer or both can comprise a POSS carrying the appropriate functional group(s).

Examples of non-POSS diacids, polyacids, diesters or polyesters that may be used for preparing an amorphous polyester resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophtalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The diacid, polyacid, diester or polyester reagent may be present, for example, in an amount from about 40 to about 60 mole % of the resin, from about 42 to about 52 mole % of the resin, from about 45 to about 50 mole % of the resin. Optionally a second polyacid may be used in an amount from about 0.1 to about 10 mole % of the resin.

Examples of diols or polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, and combinations thereof. The amount of diol or polyol may vary, and may be present, for example, in an amount from about 40 to about 60 mole % of the resin, from about 42 to about 55 mole % of the resin, from about 45 to about 53 mole % of the resin.

Polycondensation catalysts may be used in forming the amorphous (or crystalline) polyester resin, and include tetraalkyl titanates, dialkyltin oxides, such as, dibutyltin oxide, tetraalkyltins, such as, dibutyltin dilaurate, dialkyltin oxide hydroxides, such as, butyltin oxide hydroxide, aluminum alkoxides, alkyl zinc, dialkyl zinc, zinc oxide, stannous oxide or combinations thereof. Such catalysts may be used in amounts of, for example, from about 0.01 mole % to about 5 mole % based on the starting polyacid or polyester reagent(s) used to generate the polyester resin.

Examples of amorphous resins which may be used include alkali sulfonated-polyester resins, branched alkali sulfonated-polyester resins, alkali sulfonated-polyimide resins and branched alkali sulfonated-polyimide resins. Alkali sulfonated polyester resins may be useful in embodiments, such as, the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate) and copoly(propylene-butylene-terephthalate)-copoly(propylene-butylene-5-sulfo-isophthalate), wherein the alkali metal is, for example, a sodium, a lithium or a potassium ion.

In embodiments, an unsaturated amorphous polyester resin may be used as a latex resin. Examples of such resins include those disclosed in U.S. Pat. No. 6,063,827, the disclosure of which is hereby incorporated by reference in entirety. Exemplary unsaturated amorphous polyester resins include, but are not limited to, poly(1,2-propylene fumarate), poly(1,2-propylene itaconate) and combinations thereof.

For forming a crystalline polyester resin, suitable polyols include aliphatic polyols with from about 2 to about 36 carbon atoms, such as, 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfoaliphatic diols, such as, sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like, including structural isomers thereof.

Examples of polyacid or polyester reagents for preparing a crystalline resin include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a polyester or anhydride thereof; an alkali sulfoorganic polyacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The polyacid may be selected in an amount of from about 40 to about 60 mole %, from about 42 to about 52 mole %, from about 45 to about 50 mole %. Optionally, a second polyacid may be selected in an amount from about 0.1 to about 10 mole % of the resin.

Specific crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipatenonylene-decanoate), poly(octylene-adipate), and so on, wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly (propylene-sebecamide). Examples of polyimides include poly(ethylene-adipimide), poly(propylene-adipimide), poly (butylene-adipimide), poly(pentylene-adipimide), poly (hexylene-adipimide), poly(octylene-adipimide), poly(ethylene-succinimide), poly(propylene-succinimide), and poly (butylene-succinimide).

Suitable crystalline resins which may be utilized, optionally in combination with an amorphous resin as described above, include those disclosed in U.S. Pub. No. 2006/0222991, the disclosure of which is hereby incorporated by reference in entirety.

A suitable crystalline resin may include a resin formed of ethylene glycol and a mixture of dodecanedioic acid and fumaric acid co-monomers.

Examples of other suitable resins or polymers which may be utilized in forming a toner include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), polystyrene-butadiene-acrylic acid), poly(styrene-butadiene-methacrylic acid), polystyrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and combinations thereof, where some or all of one or more of the component monomers comprise a POSS monomer. The polymer may be, for example, block, random or alternating copolymers.

The crystalline resin may be present, for example, in an amount from about 1 to about 85% by weight of the toner components, from about 2 to about 50% by weight of the toner components, from about 5 to about 15% by weight of the toner components. The crystalline resin may possess melting points (MP) of, for example, from about 30° C. to about 120° C., from about 50° C. to about 90° C., from about 60° C. to about 80° C. The crystalline resin may have a number average molecular weight ($M_n$), as measured by gel permeation chromatography (GPC) of from about 1,000 to about 50,000, from about 2,000 to about 25,000; and a weight average molecular weight ($M_w$) of from about 2,000 to about 100,000, from about 3,000 to about 80,000, as determined by GPC. The molecular weight distribution ($M_w/M_n$) may be from about 2 to about 6, from about 3 to about 4.

b. Polyhedral Oligomeric Silsesquioxanes (POSS).

As disclosed herein, a polyhedral oligomeric silsesquioxane moiety is used as a monomer for forming a toner resin.

Suitable polyhedral oligomeric silsesquioxanes are those that comprise a suitable functional group and may be selected from, for example, TMPdiolisobutyl POSS®, trans-cyclohexanediolisobutyl POSS®, 1,2-propanediolisobutyl POSS®, octa(3-hydroxy-3-methylbutyldimethylsiloxy) POSS®, aminopropylisobutyl POSS®, aminopropylisooctyl POSS®, aminoethylaminopropyl isobutyl POSS®, octaminophenyl POSS®, N-phenylaminopropyl POSS®, N-methylaminopropylisobutyl POSS®, octaammonium POSS®, p-aminophenylcyclohexyl POSS®, m-aminophenylcyclohexyl POSS®, p-aminopheynlisobutyl POSS®, m-aminophenylisobutyl POSS®, maleamic acid-cyclohexyl POSS®, maleamic acid-isobutyl POSS®, octa-maleamic acid POSS®, epoxycyclohexylisobutyl POSS®, epoxycyclohexyl POSS®, glycidyl POSS®, glycidylethyl POSS®, glycidylisobutyl POSS®, glycidylisooctyl POSS®, triglycidylcyclohexyl POSS®, triglycidylisobutyl POSS®, octaepoxycyclohexyldimethylsilyl POSS®, octaglycidyldimethylsilyl POSS®, trifluoropropyl POSS®, trifluoropropylisobutyl POSS®, chlorobenzylisobutyl POSS®, chlorobenzylethylisobutyl POSS®, chloropropylisobutyl POSS®, actakis (dibromoethyl) POSS®, maleimidecyclohexyl POSS®, maleimidesiobutyl POSS®, acryloisobutyl POSS®, methacrylisobutyl POSS®, methacrylatecyclohexyl POSS®, methacrylateisobutyl POSS®, methacrylateethyl POSS®, methacrylethyl POSS®, methacrylateisooctyl POSS®, methacrylisooctyl POSS®, methacrylphenyl POSS®, methacryl POSS®, acrylo POSS®, dodecaphenyl POSS®, isooctyl POSS®, phenylisobutyl POSS®, phenylisooctyl POSS®, isooctylphenyl POSS®, octaisobutyl POSS®, octamethyl POSS®, octaphenyl POSS®, octaTMA POSS®, octatrimethylsiloxy POSS®, cyanopropylisobutyl POSS®, norbornenylethylethyl POSS®, norbornenylethylisobutyl POSS®, norbornenylethyldisilanoisobutyl POSS®, trisnorborneneylisobutyl POSS®, allylsiobutyl POSS®, monovinylisobutyl POSS®, octacyclohexenyldimethylsilyl POSS®, octavinyl POSS®, octavinyldimethylsilyl POSS®, octasilane POSS®, octahydro POSS®, trisilanolcyclohexyl POSS®, trisilanolcyclopentyl POSS®, disilanolisobutyl POSS®, trisilanolethyl POSS®, tetrasilanolphenyl POSS®, trissulfonic acid ethyl POSS®, tris sulfonic acid isobutyl POSS®, mercaptopropylisobutyl POSS®, mercaptopropylisooctyl POSS® and combinations thereof, all available from Hybrid Plastics, Hattiesburg, Miss.

Such POSS compounds can be modified to comprise one or more functional groups, such as, hydroxyl, carboxylic acid, salt thereof and so on practicing standard reagents and chemistries.

c. Catalyst

Condensation catalysts which may be used in the polyester reaction include tetraalkyl titanates; dialkyltin oxides, such as, dibutyltin oxide; tetraalkyltins, such as, dibutyltin dilaurate; dibutyltin diacetate; dialkyltin oxide hydroxides, such as, butyltin oxide hydroxide; aluminum alkoxides, alkyl zinc, dialkyl zinc, zinc oxide, stannous oxide, stannous chloride or combinations thereof. In embodiments, such catalysts may include butylstannoic acid (Fascat 4100®) and dibutyltin oxide (Fascat 4201®), both available from Arkema Inc., Philadelphia, Pa.

Such catalysts may be used in amounts of, for example, from about 0.01 mole % to about 5 mole % based on the amount of starting polyacid, polyol or polyester reagent in the reaction mixture.

Generally, as known in the art, the polyacid/polyester, comprising a POSS moiety-containing resin of interest, are mixed together, optionally with a catalyst, and incubated at an elevated temperature, such as, from about 180° C. or more, from about 190° C. or more, from about 200° C. or more, and so on, which may be conducted anaerobically, to enable esterification to occur until equilibrium, which generally yields water or an alcohol, such as, methanol, arising from forming the ester bonds in esterification reactions. The reaction may be conducted under vacuum to promote polymerization. The product is collected by practicing known methods, and may be dried, again, by practicing known methods to yield particulates.

d. Initiator

In embodiments, the resin may be a crosslinkable resin. A crosslinkable resin is a resin, for example, including a crosslinkable group or groups such as a C═C bond or a pendant group or side group, such as, a carboxylic acid group. The resin may be crosslinked, for example, through a free radical polymerization with an initiator.

Suitable initiators include peroxides, such as, organic peroxides or azo compounds, for example diacyl peroxides, such as, decanoyl peroxide, lauroyl peroxide and benzoyl peroxide, ketone peroxides, such as, cyclohexanone peroxide and methyl ethyl ketone; alkyl peroxy esters, such as, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate and t-amyl peroxy benzoate; alkyl peroxides, such as, dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy)hexyne-3; alkyl hydroperoxides, such as, 2,5-dihydro peroxy 2,5-dimethyl hexane, cumene hydroperoxide, t-butyl hydroperoxide and t-amyl hydroperoxide, and alkyl peroxyketals, such as, n-butyl 4,4- di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate; azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus, the gel content of the polyester material. The amount of initiator used may range from, for example, about 0.01 to about 10 weight %, from about 0.1 to about 5 weight % of the polyester resin. In the crosslinking, it is desirable that substantially all of the initiator be consumed. The crosslinking may be carried out at high temperature and thus, the reaction may be very fast, for example, less than 10 minutes, such as, from about 20 seconds to about 2 minutes residence time.

Polyester resins comprising a POSS suitable for use in an imaging device are those which carry one or more properties, such as, a $T_g$(onset) (also identified herein as $T_g$(on)) of from about 10° C. to about 120° C., from about 20° C. to about 110° C., from about 30° C. to about 100° C.; a $T_s$ of from about 90° C. to about 150° C., from about 100° C. to about 140° C., from about 110° C. to about 130° C.; an acid value (AV) of from about 10 to about 30, from about 3 to about 25, from about 4 to about 20; an $M_N$ from about 2,000 to about 100,000, from about 3,000 to about 90,000, from about 4,000 to about 80,000; a particle size from about 100 to about 500 nm, from about 110 to about 450 nm, from about 120 to about 400 nm; and an $M_w$ of from about 1,000 to about 50,000, from about 2,000 to about 45,000, from about 3,000 to about 40,000.

2. Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP604™ and NP608™; Magnox magnetites, TMB-100™ or TMB-104™; and the like.

Colored pigments, such as, cyan, magenta, yellow, red, orange, green, brown, blue or mixtures thereof may be used. The additional pigment or pigments may be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE 1™ available from Paul Uhlich & Company, Inc.; PIGMENT VIOLET 1™, PIGMENT RED 48™, LEMON CHROME YELLOW DCC 1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like.

Examples of magenta pigments include 2,9-dimethyl-substituted quinacridone, an anthraquinone dye identified in the Color Index as CI-60710, CI Dispersed Red 15, a diazo dye identified in the Color Index as CI-26050, CI Solvent Red 19 and the like.

Illustrative examples of cyan pigments include copper tetra (octadecylsulfonamido) phthalocyanine, a copper phthalocyanine pigment listed in the Color Index as CI-74160, CI Pigment Blue, Pigment Blue 15:3, Pigment Blue 15:4, an Anthrazine Blue identified in the Color Index as CI-69810, Special Blue X-2137 and the like.

Illustrative examples of yellow pigments are diarylide yellow 3,3-dichlorobenzidene acetoacetanilide, a monoazo pigment identified in the Color Index as CI-12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants may be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that may be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example, carbon black, cyan, magenta and/or yellow colorant, may be incorporated in an amount sufficient to impart the desired color to the toner. In general, pigment or dye, may be employed in an amount ranging from about 2% to about 35% by weight of the toner particles on a solids basis, from about 5% to about 25% by weight, from about 5% to about 15% by weight.

In embodiments, more than one colorant may be present in a toner particle. For example, two colorants may be present in a toner particle, such as, a first colorant of a blue, may be present in an amount ranging from about 2% to about 10% by weight of the toner particle on a solids basis, from about 3% to about 8% by weight; from about 5% to about 10% by weight; with a second colorant of a black that may be present in an amount ranging from about 5% to about 20% by weight of the toner particle on a solids basis, from about 6% to about 15% by weight, from about 10% to about 20% by weight and so on.

3. Optional Components a. Surfactants

Toner compositions may be in dispersions including surfactants. Emulsion aggregation methods may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

The surfactant or the total amount of surfactants may be used in an amount of from about 0.01% to about 5% by weight of the toner-forming composition, from about 0.75% to about 4% by weight of the toner-forming composition, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F and SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quarternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

b. Waxes

The toners of the instant disclosure, optionally, may contain a wax, which may be either a single type of wax or a mixture of two or more different types of waxes (hereinafter identified as, "a wax"). A wax may be added to a toner formulation or to a developer formulation, for example, to improve particular toner properties, such as, toner particle shape, charging, fusing characteristics, gloss, stripping, offset properties and the like. Alternatively, a combination of waxes may be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 wt % to about 25 wt % of the toner particles, from about 5 wt % to about 20 wt % of the toner particles.

Waxes that may be selected include waxes having, for example, an Mw of from about 500 to about 20,000, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate, and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

c. Aggregating Factor

An aggregating factor may be an inorganic cationic coagulant, such as, for example, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium and other metal halides including monovalent and divalent halides.

The aggregating factor may be present in an emulsion in an amount of from, for example, from about 0 to about 10 wt %, from about 0.05 to about 5 wt % based on the total solids in the toner.

The aggregating factor may also contain minor amounts of other components, for example, nitric acid.

In embodiments, a sequestering agent or chelating agent may be introduced after aggregation is complete to sequester or extract a metal complexing ion, such as, aluminum from the aggregation process. Thus, the sequestering, chelating or complexing agent used after aggregation is complete may comprise an organic complexing component, such as, ethylenediaminetetraacetic acid (EDTA), gluconal, hydroxyl-2,2' iminodisuccinic acid (HIDS), dicarboxylmethyl glutamic acid (GLDA), methyl glycidyl diacetic acid (MGDA), hydroxydiethyliminodiacetic acid (HIDA), potassium citrate, sodium citrate, nitrotriacetate salt, humic acid, fulvic acid; salts of EDTA, such as, alkali metal salts of EDTA, tartaric acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, and mixtures thereof d. Surface Additive In embodiments, the toner particles may be mixed with one or more additives, such as, silicon dioxide or silica ($SiO_2$), titania or titanium dioxide ($TiO_2$) and/or cerium oxide. Silica may be a first silica and a second silica. The first silica may have an average primary particle size, measured in diameter, in the range of, for example, from about 5 nm to about 50 nm, from about 5 nm to about 25 nm, from about 20 nm to about 40 nm. The second silica may have an average primary particle size, measured in diameter, in the range of, for example, from about 100 nm to about 200 nm, from about 100 nm to about 150 nm, from about 125 nm to about 145 nm. The second silica may have a larger average size (diameter) than the first silica. The titania may have an average primary particle size in the range of, for example, about 5 nm to about 50 nm, from about 5 nm to about 20 nm, from about 10 nm to about 50 nm. The cerium oxide may have an average primary particle size in the range of about 5 nm to about 50 nm, from about 5 nm to about 20 nm, from about 10 nm to about 50 nm.

Zinc stearate also may be used as an external additive. Calcium stearate and magnesium stearate may provide similar functions. Zinc stearate may have an average primary particle size in the range of, for example, from about 500 nm to about 700 nm, from about 500 nm to about 600 nm, from about 550 nm to about 650 nm.

e. Carrier

Carrier particles include those that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, nickel berry carriers as disclosed in U.S. Pat. No. 3,847,604, the entire disclosure of which is hereby incorporated herein by reference, comprised of nodular carrier beads of nickel, characterized by surfaces of reoccurring recesses and protrusions thereby providing particles with a relatively large external area, those disclosed in U.S. Pat. Nos. 4,937,166 and 4,935,326, the disclosure of each of which hereby is incorporated herein by reference, and so on. In embodiments, the carrier particles may have an average particle size of, for example, from about 20 to about 85 μm, from about 30 to about 60 μm, from about 35 to about 50 μm.

B. Toner Particle Preparation

1. Method a. Particle Formation

The toner particles may be prepared by any method within the purview of one skilled in the art, for example, any of the emulsion/aggregation methods may be used with the polyester resin comprising a polyhedral oligomeric silsesquioxane of interest. However, any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material; other mechanical processes; any process for producing nanoparticles or microparticles; and so on, if a polyester resin comprising a polyhedral oligomeric silsesquioxane of interest is used.

In embodiments relating to an emulsification/aggregation process, a resin may be dissolved in a solvent, and may be mixed into an emulsion medium, for example water, such as, deionized water, optionally containing a stabilizer, and optionally a surfactant. Examples of suitable stabilizers include various water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer may be present in amounts of from about 0.1% to about 5%, from about 0.5% to about 3% by weight of the resin. When such salts are added to the composition as a stabilizer, in embodiments, incompatible metal salts are not present in the composition, for example, a composition may be completely or essentially free of zinc and other incompatible metal ions, for example, Ca, Fe, Ba etc., that form water-insoluble salts. The phrase, "essentially free," refers, for example, to the incompatible metal ions as present at a level of less than about 0.01%, less than about 0.005% or less than about 0.001%, by weight of the wax and resin. The stabilizer may be added to the mixture at ambient temperature, or may be heated to the mixture temperature prior to addition.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

In embodiments relating to an exemplified EA process, following emulsification, toner compositions may be prepared by aggregating a mixture of a resin, a pigment, an optional wax and any other desired additives in an emulsion, optionally, with surfactants as described above, and then optionally coalescing the aggregate mixture. A mixture may be prepared by adding an optional wax or other materials, which may also be optionally in a dispersion, including a surfactant, to the emulsion comprising a resin-forming material and a pigments, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing may be at from about 600 to about 4,000 rpm. Homogenization may be by any suitable means, including, for example, an IKA ULTRA TURRAX T50 probe homogenizer.

b. Aggregation

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same.

The aggregating factor, as provided above, may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the glass transition temperature ($T_g$) of the resin or of a polymer.

The aggregating factor may be added to the mixture components to form a toner in an amount of, for example, from about 0.1 part per hundred (pph) to about 1 pph, from about 0.25 pph to about 0.75 pph.

To control aggregation of the particles, the aggregating factor may be metered into the mixture over time. For example, the factor may be added incrementally into the mixture over a period of from about 5 to about 240 minutes, from about 30 to about 200 minutes.

Addition of the aggregating factor also may be done while the mixture is maintained under stirred conditions, in embodiments, from about 50 rpm to about 1,000 rpm, from about 100 rpm to about 500 rpm; and at a temperature that is below the $T_g$ of the resin or polymer, in embodiments, from about 30° C. to about 90° C., from about 35° C. to about 70° C. The growth and shaping of the particles following addition of the aggregation factor may be accomplished under any suitable condition(s).

The particles may be permitted to aggregate until a predetermined desired particle size is obtained. Particle size may be monitored during the growth process. For example, samples may be taken during the growth process and analyzed, for example, with a COULTER COUNTER, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, from about hour 1 to about 5 hours, while maintaining stirring, to provide the desired aggregated particles. Once the predetermined desired particle size is attained, the growth process is halted.

Once the desired final size of the toner particles or aggregates is achieved, the pH of the mixture may be adjusted with base to a value of from about 5 to about 10, from about 6 to about 9. The adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like. In embodiments, EDTA may be added to assist adjusting the pH to the desired value. The base may be added in amounts from about 2 to about 25% by weight of the mixture, from about 4 to about 10% by weight of the mixture.

The characteristics of the toner particles may be determined by any suitable technique and apparatus. Volume average particle diameter and geometric standard deviation may be measured using an instrument, such as, a Beckman Coulter MULTISIZER 3, operated in accordance with the instructions of the manufacturer.

The growth and shaping may be conducted under conditions in which aggregation occurs separate from coalescence. The aggregation process may be conducted under shearing conditions at an elevated temperature, for example, of from about 40° C. to about 90° C., from about 45° C. to about 80° C., which may be below the $T_g$ of the resin or a polymer.

The aggregate particles may be of a size of less than about 3 µm, from about 2 µm to about 3 µm, from about 2.5 µm to about 2.9 µm.

c. Coalescence

Following aggregation to a desired particle size and application of any optional shell, the particles then may be coalesced to a desired final shape, such as, a circular shape, for example, to correct for irregularities in shape and size, the coalescence being achieved by, for example, heating the mixture to a temperature from about 45° C. to about 100° C., from about 55° C. to about 99° C., which may be at or above the $T_g$ of the resin(s) used to form the toner particles or which may be less than the melting point of the resin(s) and/or reducing the stirring, for example, to from about 1000 rpm to about 100 rpm, from about 800 rpm to about 200 rpm. Higher or lower temperatures may be used, it being understood that the temperature is a function of the polymer(s) used for the core and/or shell. Coalescence may be conducted over a period from about 0.01 to about 9 hours, from about 0.1 to about 4 hours, see, for example, U.S. Pat. No. 7,736,831.

After aggregation and/or coalescence, the mixture may be cooled to room temperature (RT), such as, from about 20° C. to about 25° C. The cooling may be rapid or slow, as desired. A suitable cooling method may include introducing cold water to a jacket around the reactor. After cooling, the toner particles optionally may be washed with water and then dried. Drying may be by any suitable method, including, for example, freeze-drying.

Optionally, a coalescing agent may be used. Examples of suitable coalescence agents include, but are not limited to, benzoic acid alkyl esters, ester alcohols, glycol/ether-type solvents, long chain aliphatic alcohols, aromatic alcohols, mixtures thereof and the like. Examples of benzoic acid alkyl esters include those where the alkyl group, which may be straight or branched, substituted or unsubstituted, has from about 2 to about 30 carbon atoms, such as, decyl or isodecyl benzoate, nonyl or isononyl benzoate, octyl or isooctyl benzoate, 2-ethylhexyl benzoate, tridecyl or isotridecyl benzoate, 3,7-dimethyloctyl benzoate, 3,5,5-trimethylhexyl benzoate, mixtures thereof and the like. Examples of such benzoic acid alkyl esters include VELTA® 262 (isodecyl benzoate) and VELTA® 368 (2-ethylhexyl benzoate) available from Velsicol Chemical Corp. Examples of ester alcohols include hydroxyalkyl esters of alkanoic acids, where the alkyl group, which may be straight or branched, substituted or unsubstituted, and may have from about 2 to about 30 carbon atoms, such as, 2,2,4-trimethylpentane-1,3-diol monoisobutyrate. An example of an ester alcohol is TEXANOL® (2,2,4-trimethylpentane-1,3-diol monoisobutyrate) available from Eastman Chemical Co. Examples of glycol/ether-type solvents include diethylene glycol monomethylether acetate, diethylene glycol monobutylether acetate, butyl carbitol acetate (BCA) and the like. Examples of long chain aliphatic alcohols include those where the alkyl group is from about 5 to about 20 carbon atoms, such as, ethylhexanol, octanol, dodecanol and the like. Examples of aromatic alcohols include benzyl alcohol and the like.

In embodiments, the coalescence agent (or coalescing agent or coalescence aid agent) evaporates during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent may be added prior to the coalescence or fusing step in any desired or suitable amount. For example, the coalescence agent may be added in an amount of from about 0.01 to about 10% by weight, based on the solids content in the reaction medium, from about 0.05, from about 0.1%, to about 0.5, to about 3.0% by weight, based on the solids content in the reaction medium. Of course, amounts outside those ranges may be used, as desired.

In embodiments, the coalescence agent may be added at any time between aggregation and coalescence, although in some embodiments it may be desirable to add the coalescence agent after aggregation is, "frozen," or completed, for example, by adjustment of pH, for example, by addition, for example, of base.

Coalescence may proceed over a period of from about 0.1 to about 9 hours, from about 0.5 to about 4 hours.

After coalescence, the mixture may be cooled to room temperature (RT), such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze drying.

d. Shells

In embodiments, after aggregation, generally prior to coalescence, a resin coating may be applied to the aggregated particles to form a shell thereover. Any resin described herein or as known in the art may be used as the shell. In embodiments, a polyester amorphous resin latex as described herein may be included in the shell. In embodiments, a polyester amorphous resin latex described herein may be combined with a different resin, and then added to the particles as a resin coating to form a shell. In embodiments, a low molecular weight amorphous polyester resin may be used to form a shell over the particles or aggregates.

A shell resin may be applied to the aggregated particles by any method within the purview of those skilled in the art. In embodiments, the resins used to form the shell may be in an emulsion, optionally including any surfactant described herein. The emulsion possessing the resins may be combined with the aggregated particles so that the shell forms over the aggregated particles.

Formation of the shell over the aggregated particles may occur while heating to a temperature from about 30° C. to about 80° C., from about 35° C. to about 70° C. Formation of the shell may take place for a period of time from about 5 minutes to about 10 hours, from about 10 minutes to about 5 hours.

The shell may be present in an amount from about 1% by weight to about 80% by weight of the toner components, from about 10% by weight to about 40% by weight of the toner components, from about 20% by weight to about 35% by weight of the toner components.

e. Optional Additives

In embodiments, the toner particles also may contain other optional additives.

i. Charge Additives

The toner may include any known charge additives in amounts of from about 0.1 to about 10 weight %, from about 0.5 to about 7 weight % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosure of each of which hereby is incorporated by reference in entirety, negative charge enhancing additives, such as, aluminum complexes, and the like.

Charge enhancing molecules may be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

Such enhancing molecules may be present in an amount of from about 0.1 to about 10%, from about 1 to about 3% by weight.

ii. Surface Modifications

Surface additives may be added to the toner compositions of the present disclosure, for example, after washing or drying. Examples of such surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosure of each of which hereby is incorporated by reference in entirety.

Surface additives may be used in an amount of from about 0.1 to about 10 wt %, from about 0.5 to about 7 wt % of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosure of each of which hereby is incorporated by reference in entirety, also may be present. The additive may be present in an amount of from about 0.05 to about 5%, from about 0.1 to about 2% of the toner, which additives may be added during the aggregation or blended into the formed toner product.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained catalyst, for example, $Al^{3+}$, in toner particles of the present disclosure may be from about 0.1 pph to about 1 pph, from about 0.25 pph to about 0.8 pph. The gloss level of a toner of the instant disclosure may have a gloss, as measured by Gardner gloss units (gu), of from about 20 gu to about 100 gu, from about 50 gu to about 95 gu, from about 60 gu to about 90 gu.

Hence, a particle may contain at the surface one or more silicas, one or more metal oxides, such as, a titanium oxide and a cerium oxide, a lubricant, such as, a zinc stearate and so on. In embodiments, a particle surface may comprise two silicas, two metal oxides, such as, titanium oxide and cerium oxide, and a lubricant, such as, a zinc stearate. All of those surface components may comprise about 5% by weight of a toner particle weight. There may also be blended with the toner compositions, external additive particles including flow aid additives, which additives may be present on the surface of the toner particles. Examples of these additives include metal oxides like titanium oxide, tin oxide, mixtures thereof, and the like; colloidal silicas, such as AEROSIL®, metal salts and metal salts of fatty acids, including zinc stearate, aluminum oxides, cerium oxides and mixtures thereof. Each of the external additives may be present in amounts of from about 0.1 to about 5 wt %, from about 0.1 to about 1 wt %, of the toner. Several of the aforementioned additives are illustrated in U.S. Pat. Nos. 3,590,000, 3,800,588, and 6,214,507, the disclosure of each of which is incorporated herein by reference.

Toners may possess suitable charge characteristics when exposed to extreme relative humidity (RH) conditions. The low humidity zone (C zone) may be about 10° C. and 15% RH, while the high humidity zone (A zone) may be about 28° C. and 85% RH.

Toners of the instant disclosure also may possess a parent toner charge per mass ratio (q/m) of from about −5 µC/g to about −90 µC/g, and a final toner charge after surface additive blending of from about −15 µC/g to about −80 µC/g.

Other desirable characteristics of a toner include storage stability, particle size integrity, high rate of fusing to the substrate or receiving member, sufficient release of the image from the photoreceptor, nondocument offset, use of smaller-sized particles and so on, and such characteristics may be obtained by including suitable reagents, suitable additives or both, and/or preparing the toner with particular protocols.

The dry toner particles, exclusive of external surface additives, may have the following characteristics: (1) volume average diameter (also referred to as "volume average particle diameter") of from about 2.5 to about 20 µm, from about 2.75 to about 10 µm, from about 3 to about 7.5 µm; (2) number average geometric standard deviation (GSDn) and/or volume average geometric standard deviation (GSDv) of from about 1.18 to about 1.30, from about 1.21 to about 1.24; and (3) circularity of from about 0.9 to about 1.0 (measured with, for example, a Sysmex FPIA 2100 analyzer), from about 0.95 to about 0.985, from about 0.96 to about 0.98. The toner can have a minimum fusing temperature less than about 150° C., less than about 140° C., less than about 130° C.

III. Developers

A. Composition

The toner particles thus formed may be formulated into a developer composition. For example, the toner particles may be mixed with carrier particles to achieve a two component developer composition. The toner concentration in the developer may be from about 1% to about 25% by weight of the total weight of the developer, from about 2% to about 15% by weight of the total weight of the developer, with the remainder of the developer composition being the carrier. However, different toner and carrier percentages may be used to achieve a developer composition with desired characteristics.

1. Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 wt % to about 70 to about 30 wt %, from about 40 to about 60 wt % to about 60 to about 40 wt %. The coating may have a coating weight of, for example, from about 0.1 to about 5% by weight of the carrier, from about 0.5 to about 2% by weight of the carrier.

Various effective suitable means may be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and thereafter classified to a desired particle size.

The carrier particles may be prepared by mixing the carrier core with polymer in an amount from about 0.05 to about 10% by weight, from about 0.01 to about 3% by weight, based on the weight of the coated carrier particle, until adherence thereof to the carrier core is obtained, for example, by mechanical impaction and/or electrostatic attraction.

In embodiments, suitable carriers may include a steel core, for example, of from about 25 to about 100 µm in size, from about 50 to about 75 µm in size, coated with about 0.5% to about 10% by weight, from about 0.7% to about 5% by weight of a polymer mixture including, for example, methylacrylate and carbon black, using the process described, for example, in U.S. Pat. Nos. 5,236,629 and 5,330,874.

IV. Devices Comprising a Toner Particle

Toners and developers may be combined with a number of devices ranging from enclosures or vessels, such as, a vial, a bottle, a flexible container, such as a bag or a package, and so on, to devices that serve more than a storage function.

A. Imaging Device Components

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable. Such a device may comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

B. Toner or Developer Delivery Device

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

V. Imaging Devices

The toners or developers may be used for electrostatographic or electrophotographic processes, including those disclosed in U.S. Pat. No. 4,295,990, the disclosure of which hereby is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated.

EXAMPLES

Resin 1 was constructed of terephthalic acid (TA), trans-cyclohexanediol isobutyl POSS (POSS), isosorbide (IS), dodecylsuccinic anhydride (DSA) and Fascat 4100® catalyst were charged into a Parr reactor and the reactor temperature was increased to 245-255° C. for transesterification resulting in oligomers with water as by-product. The reaction occurred at atmospheric pressure for about 1-2 hours.

Continuous removal of water shifts the equilibrium of the reaction to product formation. The reaction was continued at 215-225° C. under vacuum until completion of the reaction resulting in hydroxylated polyester.

Then, trimellitic anhydride (TMA) and Fascat 4201® catalyst were charged into the reactor and the temperature was decreased to 185-205° C. for acid functionalization of the polymer. The reaction produced the acid-end group resin and water as by-product. This step was carried out at atmospheric pressure for about 2 hours. The polymer was then discharged from the reactor.

The end of the polycondensation reaction was determined using softening point (SP) analysis, where polyester samples were periodically removed from the reactor and tested for polymerization endpoint. The reaction and removal of water by-product were halted during the SP analysis (about 20-30 min per sample). The SP was determined using a METTLER FP800 THERMOSYSTEM consisting of FP80 Central Processor and FP83 Dropping Cell. About 0.5 g of crushed sample from the reactor was pelletized and placed in the Dropping Cell at 110° C. The temperature was programmed to increase at 1° C./min until the target SP was reached.

Resins 2 and 3 were synthesized in the same manner as was Resin 1, where all reactants were added to a Parr reactor upfront except for TMA which was added after transesterification and polycondensation. Resin 2 contained dimethyl terephthalate (DMT). Resin 3 contained dimethyl naphthalene-2,6-dicarboxylate (NDC) and 1,2-propylene glycol (PPG).

Table 1 shows the composition and analytical properties of the three resins made with POSS monomer, as compared to commercially available BPA-containing control resins.

TABLE 1

Experimental formulations and properties of synthesized BPA-free resins compared to BPA-containing resins.

| Resin ID | Monomers (mol/eq) | | | | | | | | Ts (° C.) | Tg (on) (° C.) | AV | Mn | Mw |
|---|---|---|---|---|---|---|---|---|---|---|---|---|---|
| | IS | DSA | DMT | TA | NDC | PPG | POSS | TMA | | | | | |
| 1 | 0.35 | 0.15 | | 0.30 | | | 0.15 | 0.05 | 141.0 | 31.8 | 19.7 | 1400 | 2370 |
| 2 | | 0.15 | 0.40 | | | | 0.40 | 0.05 | <100 | 13.9 | 5.0 | 2486 | 4710 |
| 3 | | | | | 0.40 | 0.20 | 0.35 | 0.05 | 96.3 | 65.7 | 13.9 | 2080 | 5780 |
| Control 1 | BPA-containing Resin | | | | | | | | 129.0 | 56.7 | 12.7 | 5600 | 53300 |
| Control 2 | BPA-containing Resin | | | | | | | | 118.0 | 59.5 | 14.7 | 5000 | 19400 |

IS was used in Resin 1 to enhance the overall rigidity and Tg of resin, while Resin 2 contained DMT instead of TA to help improve processing (due to the lower MP of DMT), and only POSS (no IS) to help with any solubility issues with methyl ethyl ketone (MEK)/isopropyl alcohol (IPA) phase inversion emulsification (PIE) solvents. Resin 3 was simplified to contain NDC, PPG, POSS and TMA.

The resins possessed properties similar to that of the BPA-containing commercial resins. Emulsification of Resin 1 provided particles of 407 nm±0.466. The rheology of Resin 1 showed a good transition of viscosity from low to high temperatures, with properties characteristic of amorphous resins of conventional EA toners.

To a 2 liter glass reactor equipped with an overhead mixer are added Resin 1, 2 or 3, optionally, an amorphous oligomeric resin ($M_w$=19,400, $T_g$ onset=60° C.), crystalline polyester ($M_w$ 23,300, $M_n$=10,500, $T_m$=71° C., polymethylene wax emulsion and cyan pigment PB15:3. After adjusting the pH of the toner reaction slurry to 3.2 using 0.3M $HNO_3$ solution, $Al_2(SO_4)_3$ is added under homogenization. The mixture is heated for aggregation at 250 rpm. The particle size is monitored with a Coulter Counter until the core particles reach a volume average particle size of about 5 μm with a GSD volume of about 1.2. Then, additional amorphous oligomeric resin is added to form a shell, resulting in core-shell particles with an average particle size of about 6 μm and GSD volume of 1.2. Thereafter, the pH of the reaction slurry is increased 4 wt % NaOH and EDTA is added to freeze toner growth. After freezing, the reaction mixture is heated and the pH is reduced for coalescence. The toner is quenched after coalescence and has a final particle size of about 6 μm, a GSD volume of 1.2 and circularity of about 0.965. The toner slurry is cooled to room temperature, is separated by sieving (25 μm) and filtration, followed by washing and then freeze-drying. The toner particles are tested for routine parameters and found to be comparable to the BPA-containing resins noted above.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A toner resin comprising a polyester consisting of an alcohol monomer and an acid monomer, wherein said alcohol monomer or said acid monomer comprises a polyhedral oligomeric silsesquioxane (POSS) monomer of the formula:

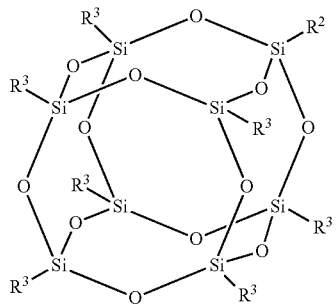

wherein $R^2$ and $R^3$ may be the same or different, each of at least two R groups comprises a hydroxyl group or each of at least two R groups comprises an acid group, or a salt thereof and each of $R^2$ and $R^3$ comprises an aliphatic alkyl group, which may be branched; an unsaturated alkyl group, which may be branched; a cyclic group, which may be aromatic; a halide; a hydroxyl group; an acid, or a salt thereof; an amine; a nitrile; a cyanate; and amide; or combinations thereof.

2. The toner resin of claim 1, wherein the PUSS comprises a polyol.

3. The toner resin of claim 1, wherein the POSS comprises a polyacid.

4. The toner resin of claw 1, wherein the resin further comprises a diacid, a polyacid or salt thereof.

5. The toner resin of claim 1, wherein the resin further comprises a diol or a polyol.

6. The toner resin of claim 1, wherein the resin has a Tg (on) of from about 10° C. to about 120° C.

7. The toner resin of claim 1, wherein the resin has a Ts (softening temperature) of from about 90° C. to about 150' C.

8. The toner resin of claim 1, wherein the resin has an Mn of from about 1,000 to about 50,000 and an Mw of between about 2,000 to about 100,000.

9. The toner resin of claim 1, wherein the resin has an acid value (AV) of between about 2 to About 30.

10. The toner resin of claim 1, further comprising an aromatic compound.

11. The toner resin of claim 10, wherein the aromatic compound comprises a cyclic anhydride.

12. The toner resin of claim 11, wherein the cyclic anhydride comprises trimellitic anhydride.

13. The toner resin of claim 1, wherein the polyhedral oligomeric silsesquioxane comprises trans-cyclohexanediol isobutyl poly-octahedral oligomeric silsesquioxane.

14. The toner resin of claim 1, wherein said resin comprises a particle size of between about 100 nm to about 500 nm.

15. A toner comprising the toner resin of claim 1; an optional colorant; and an optional wax.

16. The toner of claim 15, further comprising a crystalline resin.

17. The toner of claim 15, further comprising an amorphous resin.

18. The toner of claim 15, comprising a minimum fusing temperature less than about 150° C.

19. The toner of claim 15, comprising a colorant.

20. The toner of claim 15, comprising an emulsion/aggregation toner.

* * * * *